United States Patent [19]
Monereau

[11] Patent Number: 5,314,528
[45] Date of Patent: May 24, 1994

[54] PERMEATION PROCESS AND APPARATUS

[75] Inventor: Christian Monereau, Paris, France

[73] Assignee: L'Air Liquide, Societe Anonyme pour l'Etude et l'Exploitation des Procedes Georges Claude, Paris, France

[21] Appl. No.: 976,472

[22] Filed: Nov. 16, 1992

[30] Foreign Application Priority Data

Nov. 18, 1991 [FR] France ............... 91 14167

[51] Int. Cl.$^5$ .............................................. B01D 53/22
[52] U.S. Cl. .......................................... 95/55; 96/7; 96/9
[58] Field of Search .............. 55/16, 68, 158; 95/45, 95/55; 96/7, 9

[56] References Cited

U.S. PATENT DOCUMENTS

| | | | |
|---|---|---|---|
| 3,208,197 | 9/1965 | Simon et al. ............... | 55/16 |
| 3,246,450 | 4/1966 | Stern et al. ............... | 55/16 |
| 3,250,080 | 5/1966 | Garwin ............... | 55/16 X |
| 3,339,341 | 9/1967 | Maxwell et al. ............... | 55/158 X |
| 3,442,002 | 5/1969 | Geary, Jr. et al. ............... | 55/158 X |
| 3,961,917 | 6/1976 | Benedict et al. ............... | 55/16 |
| 4,104,037 | 8/1978 | Garrett et al. ............... | 55/16 |
| 4,119,417 | 10/1978 | Heki et al. ............... | 55/16 X |
| 4,130,403 | 12/1978 | Codey et al. ............... | 55/16 |
| 4,140,499 | 2/1979 | Ozaki et al. ............... | 55/16 X |
| 4,180,388 | 12/1979 | Graham et al. ............... | 55/16 |
| 4,435,191 | 3/1984 | Graham ............... | 55/16 |
| 4,478,719 | 10/1984 | Michele et al. ............... | 55/16 X |
| 4,597,777 | 7/1986 | Graham ............... | 55/16 |
| 4,707,342 | 11/1987 | Iniotakis et al. ............... | 55/16 X |
| 4,718,921 | 1/1988 | Makino et al. ............... | 55/16 |
| 4,836,833 | 6/1989 | Nicholas et al. ............... | 55/16 |
| 4,931,070 | 6/1990 | Prasad ............... | 55/158 X |
| 4,994,094 | 2/1991 | Behling et al. ............... | 55/16 |
| 5,064,446 | 11/1991 | Kusuki et al. ............... | 55/16 |
| 5,169,412 | 12/1992 | Prasad et al. ............... | 55/16 |
| 5,185,014 | 2/1993 | Prasad ............... | 55/16 |

FOREIGN PATENT DOCUMENTS

| | | |
|---|---|---|
| 0051469 | 5/1982 | European Pat. Off. . |
| 0358551 | 3/1990 | European Pat. Off. . |
| 0430304 | 6/1991 | European Pat. Off. ...... 55/16 |
| 0463535 | 1/1992 | European Pat. Off. ...... 55/158 |
| 59-207827 | 11/1984 | Japan ...... 55/16 |
| 60-238120 | 11/1985 | Japan ...... 55/158 |
| 63-123421 | 5/1988 | Japan ...... 55/158 |
| 63-123422 | 5/1988 | Japan ...... 55/158 |
| 1-143626 | 6/1989 | Japan ...... 55/16 |
| 3-245812 | 11/1991 | Japan ...... 55/16 |
| 2053021 | 2/1981 | United Kingdom . |

*Primary Examiner*—Robert Spitzer
*Attorney, Agent, or Firm*—Curtis, Morris & Safford

[57] ABSTRACT

The apparatus includes two permeators mounted in series, namely a simple permeator with an inlet and two outlets, and a reflux permeator. The production gas results from the combination of the two permeated products. Application to the production of impure hydrogen.

13 Claims, 1 Drawing Sheet

PERMEATION PROCESS AND APPARATUS

BACKGROUND OF THE INVENTION (a) Field of the Invention

The present invention relates to a process and an apparatus for the production of an impure light gas by permeation, starting from a gaseous mixture. It is particularly applicable to the production of impure hydrogen starting from a mixture consisting essentially of hydrogen, nitrogen and hydrocarbons.

(b) Description of Prior Art

In some industrial applications, hydrogen is needed, which has a low purity, lower than that which may be obtained with simple permeators, i.e. having an inlet and two active outlets, namely a high pressure inlet, a high pressure outlet and a low pressure outlet.

To increase the hydrogen extraction yield while lowering its purity, it has been proposed to bypass a portion of the supply flow or "feed". It has also been proposed, for the same purpose, to use reflux permeators, instead of simple permeators, in which a portion of the residual gas is returned in the low pressure space in order to lower the partial pressure of hydrogen therein. These expedients enable to effectively increase the yield of extraction of hydrogen or, for a given yield, to decrease the investment, i.e. essentially the required surface of the permeation membrane.

The invention aims at increasing much more importantly the increase of extraction yield or of the investment.

SUMMARY OF THE INVENTION

For this purpose, the process according to the invention is characterized in that:

there is used a permeation apparatus comprising two permeation stages each having a high pressure inlet of gas mixture to be treated, a high pressure outlet of residual gas and a low pressure outlet for the permeated product, the first stage consisting of a simple permeator, i.e. having an active inlet and two active outlets, namely a high pressure inlet for gas mixture to be treated, a high pressure outlet of residual gas and a low pressure outlet of permeated product, or a plurality of simple permeators mounted in series and/or in parallel;

the second stage consisting of a reflux permeator, i.e. having two inlets and two active outlets, namely a high pressure inlet of gas mixture to be treated, a high pressure outlet of residual gas, a low pressure inlet of gas mixture reflux and a low pressure outlet of permeated product, or a plurality of reflux permeators mounted in series and/or in parallel;

the initial gas mixture is introduced at the high pressure inlet of the first stage;

the residual gas from the first stage is introduced at the high pressure inlet of the second stage;

a reflux gas mixture withdrawn from the apparatus and having a lower content of said light gas than that of said production light gas, is introduced at the low pressure inlet of the second stage; and the permeated products of the two stages are combined to constitute said impure production light gas.

The reflux gas mixture may for example be withdrawn from the residual gas of the second stage.

It is also an object of the invention to provide an apparatus adapted for carrying out such process. This apparatus is characterized in that it comprises two permeation stages each having a high pressure inlet for the gas mixture to be treated, a high pressure outlet of residual gas and a low pressure outlet of permeated product, the first stage consisting of a simple permeator, i.e. having an active inlet and two active outlets, namely a high pressure inlet of gas mixture to be treated, a high pressure outlet of residual gas and a low pressure outlet of permeated product, or a plurality of simple permeators mounted in series and/or in parallel;

the second stage consisting of a reflux permeator, i.e. having two inlets and two active outlets, namely a high pressure inlet of gas mixture to be treated, a high pressure outlet of residual gas, a low pressure inlet of reflux gas mixture and a low pressure outlet of permeated product, or a plurality of reflux permeators mounted in series and/or in parallel;

the high pressure inlet of the first stage being connected to the high pressure inlet of second stage;

the apparatus comprising a feeding duct connected to the high pressure inlet of the first stage, a production duct connected to the low pressure outlets of the two stages, and, for the or each permeator of the second stage, a reflux duct ending at the low pressure inlet of this permeator and carrying a reflux gas mixture withdrawn from the apparatus and having a content of said light gas lower than that of said impure production light gas.

BRIEF DESCRIPTION OF DRAWINGS

Embodiments of the invention will now be described with reference to the annexed drawing, in which.

DESCRIPTION OF PREFERRED EMBODIMENTS

Figure 1:
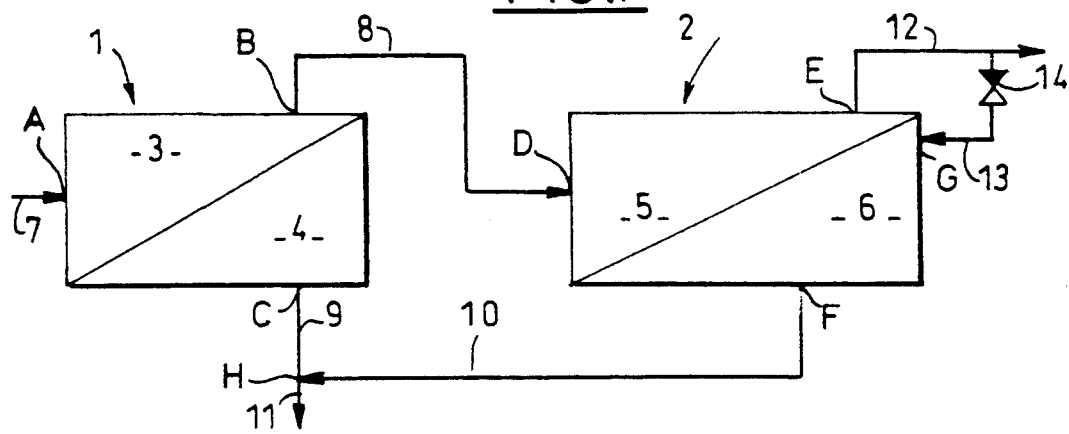
FIG. 1 is a schematic illustration of a permeation apparatus according to the invention.

The apparatus illustrated in FIG. 1 consists of two permeation stages 1 and 2 mounted in series. In the example under consideration, it is intended to produce impure hydrogen having a purity of the order of 85% with a hydrogen extraction yield higher than 90%.

Stage 1 consists of a simple permeator, i.e. in which the high pressure space 3 includes a high pressure inlet A and a high pressure outlet B and in which the low pressure space 4 includes only a low pressure outlet C.

Stage 2 consists of a reflux permeator, i.e. in which the high pressure space 5 includes a high pressure inlet D and a high pressure outlet E and in which the low pressure space 6 includes, in addition to a low pressure outlet F, a low pressure inlet G.

The apparatus also includes a supply duct 7 connected at the inlet A, a bonding duct 8 connecting the outlet B to the inlet D, a duct 9 originating from outlet C, a duct 10 connecting the outlet F to a point H of duct 9, a production duct 11 originating from point H, a duct for the evacuation of residual gas 12 originating from outlet E, and a reflux duct 13 provided with an expansion valve 14 and connecting a point of duct 12 to the inlet G.

In operation, the starting mixture, essentially consisting of hydrogen, for example with a content of the order of 50%, and heavier products such as nitrogen and hydrocarbons, is introduced via duct 7 under a pressure of a few tens of bars.

The first stage 1 produces a first permeated product in duct 9 and its residual gas feeds the second stage via duct 8. The second stage produces the residual gas of the apparatus in duct 12, and a second permeated product in duct 10. Part of the residual gas is returned into the low pressure space 6 via duct 13, after expansion in the expansion valve 14. The two permeated products are combined at H to constitute the impure production hydrogen of the apparatus, which is withdrawn via duct 11.

It has been noted, surprisingly, that the combination thus described of a simple permeator and a reflux permeator, mounted in series in this order, substantially improves the yield of extraction of hydrogen for a given investment, or, for a given yield, it enables to substantially reduce the investment, namely the required surface of the permeation membrane.

As a variant, the reflux gas from the permeator 2 may be withdrawn from duct 8 or duct 7.

Figure 2:
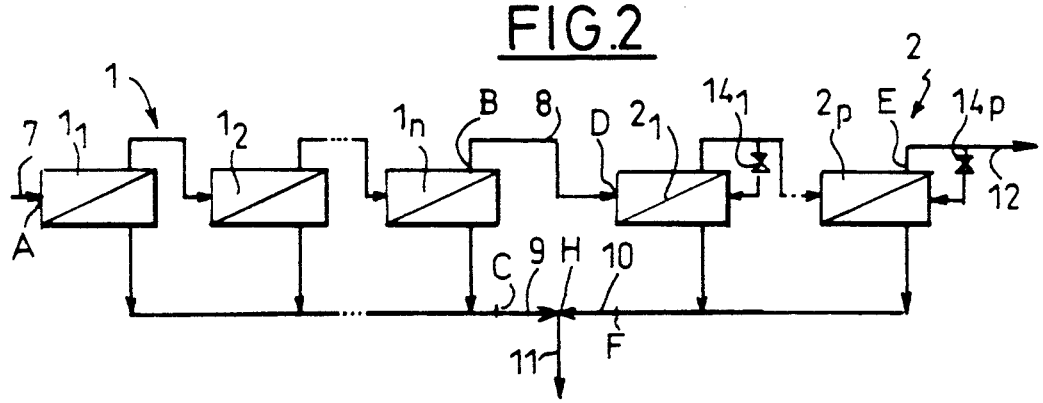
FIGS. 2 and 3 are schematic illustrations of two variants.

As illustrated in FIG. 2, each stage 1, 2 may be constituted not by a single permeator as in FIG. 2, but by a plurality of similar permeators mounted in series.

More specifically, in this variant, stage 1 consists of n simple permeators $1_1 \ldots, 1_n$. The high pressure inlet of the permeator $1_1$, constitutes the high pressure inlet A of stage 1, while the high pressure outlet of each permeator $1_1 \ldots, 1_{n-1}$ is connected to the high pressure inlet of the following permeator, that of permeator $1_n$ constituting the high pressure outlet B of the first stage. Duct 9 is connected to all the low pressure outlets of the n permeators.

Similarly, stage 2 consists of p reflux permeators $2_1, \ldots, 2_p$ mounted in series. More specifically, the high pressure inlet of permeator $2_1$ constitutes the high pressure inlet D of stage 2, connected at point B by means of duct 8, the high pressure outlet of each permeator $2_1, \ldots, 2_{p-1}$ is connected on the one end, by an expansion valve $14_1, \ldots 14_{p-1}$ to the low pressure inlet of the same permeator, and on the other end to the high pressure inlet of the following permeator, while the high pressure outlet of the permeator $2_p$ constitutes the high pressure outlet E of the second stage and discharges to duct 12 for the evacuation of residual gas and also is connected through expansion valve 14p to the lower pressure inlet of the permeator $2_p$.

The low pressure outlets of the permeator of the first stage are all connected at a same point C, and the low pressure outlets of the permeators of the second stage are all connected at a same point F. As in FIG. 1, ducts 9 and 10 respectively connect points C and F to a same point H, from where the duct for the production of impure hydrogen 11 originates.

Figure 3:
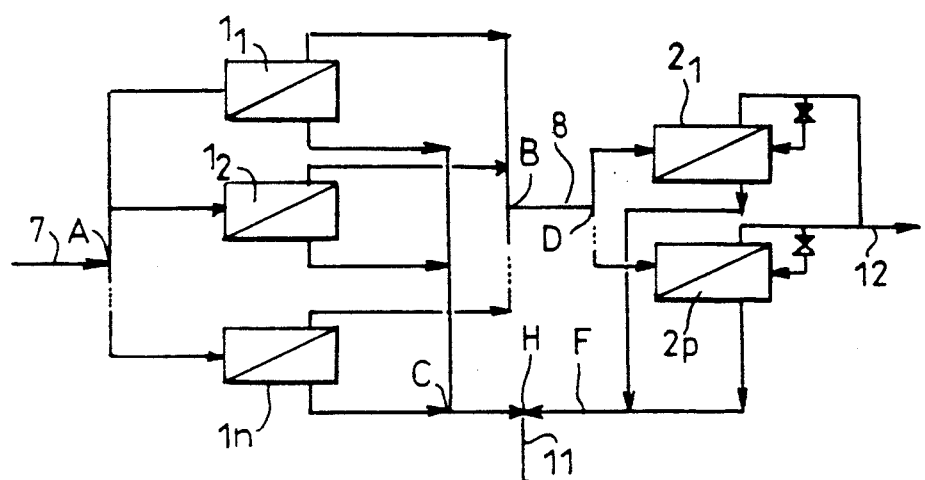

In the variant of FIG. 3, each stage 1 and 2 consists of a series of similar permeators (simple for stage 1, with reflux for stage 2) mounted in parallel. Thus, the feed ending at point A is divided into n supply flows, and the n residual gas of the permeators $1_1 \ldots, 1_n$ are combined at a point B to constitute the feeding mixture of the second stage 2. And, at point D, connected at point B by means of duct 8, this mixture is in turn divided into p flows, respectively supplying permeators $2_1, \ldots, 2_p$. The residual gases from the second stage are all combined in duct 12, which is used for withdrawing residual gas from the apparatus and, as in FIG. 2, the permeated products of the first stage are all combined in a single point C, the permeated products of the second stage are all combined at a point F, and points C and F are combined at a point H where the production duct 11 originates.

Of course, other combinations of permeators in series and in parallel may be designed, as long as the first stage 1 consists of simple permeators and the second stage 2 consists of reflux permeators.

In apparatuses including more than two permeators, various gases may be provided to serve as reflux gas, namely in addition to the feed, the various residual gases from the permeators.

We claim:

1. A process of obtaining production of an impure light gas by permeation from a gas mixture containing said light gas, comprising the steps of:
   providing a permeation apparatus comprising a first permeation stage including at least one permeator of a first type having a high pressure side with an inlet and an outlet, and a low pressure side with an outlet only and a second permeation stage including at least one permeator of a second type having a high pressure side with an inlet and an outlet, and a low pressure side with an inlet and an outlet;
   introducing the gas mixture under pressure into the inlet of the high pressure side of a permeator of the first permeation stage;
   passing residual gas from the outlet of the high pressure side of a permeator of the first permeation stage to the inlet of the high pressure side of a permeator of the second permeation stage;
   withdrawing residual gas from the outlet of the high pressure side of a permeator of the second permeation stage;
   introducing into the inlet of the low pressure side of at least one permeator of the second permeation stage a gas mixture having a light gas content lower than the light gas content of the production gas; and
   withdrawing permeate gas from the outlets of the low pressure sides of the permeators of the first and second permeation stages as said production gas.

2. The process of claim 1, wherein the gas mixture introduced into the inlet of the low pressure side of said at least one permeator of the second permeation stage is a residual gas from the permeation apparatus at a reduced pressure.

3. The process of claim 2, wherein said residual gas introduced into the inlet of the low pressure side of said at least one permeator of the second permeation stage is part of the residual gas withdrawn from the outlet of the high pressure side of the permeator of the second permeation stage.

4. The process of claim 1 wherein the production gas is hydrogen.

5. An apparatus for the production of an impure light gas by permeation from a gas mixture containing said light gas, comprising:
   a first permeation stage comprising at least one permeator of a first type having a high pressure side with an inlet connectable to a source of said gas mixture and an outlet, and a low pressure side with an outlet only, said outlet of the low pressure side being connected to a product line supplying said impure light gas;
   a second permeation stage comprising at least one permeator of a second type having a high pressure side with an inlet and an outlet, and a low pressure side with an outlet connected to the product line and an inlet;

means for connecting the outlet of the high pressure side of a permeator in the first permeation stage to the inlet of the high pressure side of a permeator in the second permeation stage; and means for supplying to the inlet of the low pressure side of the permeator in the second permeation stage a gas mixture having a light gas content lower than the light gas content of the production impure light gas available in the product line.

6. The apparatus of claim 5, wherein said means for supplying to the inlet of the low pressure side of the permeator in the second permeation stage comprises a reflux duct connected to said outlet of the high pressure side of a permeator in said second permeation stage and including at least one pressure-reducing valve.

7. The apparatus of claim 5, wherein the first permeation stage comprises at least two serially arranged permeators of the first type.

8. The apparatus of claim 7, wherein the second permeation stage comprises at least two serially arrange permeators of the second type.

9. The apparatus of claim 8, wherein the outlet of the high pressure side of an upstream permeator in the second permeation stage is connected to the inlet of the high pressure side of a downstream permeator in that stage.

10. The apparatus of claim 9, wherein the inlet of the low pressure side of each permeator in the second permeation stage is connected to the outlet of the high pressure side thereof via a pressure reducing valve.

11. The apparatus of claim 5, wherein the first permeation stage comprises at least two permeators of the first type connected in parallel.

12. The apparatus of claim 11, wherein the second permeation stage comprises at least two permeators of the second type connected in parallel.

13. The apparatus of claim 12, wherein the inlet of the low pressure side of each permeator in the second permeation stage is connected to the outlet of the high pressure side thereof via a pressure reducing valve.

* * * * *